(12) United States Patent
Datta

(10) Patent No.: US 7,726,660 B2
(45) Date of Patent: *Jun. 1, 2010

(54) NON-CONTACTING SEAL FOR ROTATING SURFACES

(75) Inventor: Amitava Datta, East Greenwich, RI (US)

(73) Assignee: Rexnord Industries, LLC, Milwaukee, WI (US)

( * ) Notice: Subject to any disclaimer, the term of this patent is extended or adjusted under 35 U.S.C. 154(b) by 218 days.

This patent is subject to a terminal disclaimer.

(21) Appl. No.: 11/803,337

(22) Filed: May 14, 2007

(65) Prior Publication Data

US 2007/0296158 A1 Dec. 27, 2007

Related U.S. Application Data

(63) Continuation of application No. 11/121,374, filed on May 4, 2005, now Pat. No. 7,216,871.

(60) Provisional application No. 60/567,868, filed on May 4, 2004.

(51) Int. Cl.
*F16D 11/02* (2006.01)
*F16J 15/44* (2006.01)
*F16J 15/447* (2006.01)

(52) U.S. Cl. .................. 277/411; 277/415; 277/416

(58) Field of Classification Search ............... 277/409, 277/411, 415, 416, 419, 422
See application file for complete search history.

(56) References Cited

U.S. PATENT DOCUMENTS 2,181,203 A * 11/1939 Reynolds ............... 277/504

4,399,998 A 8/1983 Otto
5,144,882 A 9/1992 Weissgerber (Continued)

FOREIGN PATENT DOCUMENTS

EP   0629412 A2   12/1994

(Continued)

OTHER PUBLICATIONS

Alkali Corrosion Resistant Coatings for Si3N4 Ceramics, J.J. Brown, 1997, Journal of materials science 32 (1997) 4455-4461.*

(Continued)

*Primary Examiner*—Vishal Patel
(74) *Attorney, Agent, or Firm*—BainwoodHuang

(57) ABSTRACT

A non-contacting seal for sealing in high temperature applications includes at least one segment having an inner pad with a hydrodynamic/hydrostatic lift-off geometry enabling the seal to run in a non-contact mode, and at least one finger spring supported on the pad that aids in making the seal radially compliant while also being axially stiff, compared to the radial direction. In one embodiment, multiple segments are supported on a support member spaced from the pad to form a gap (g) therebetween. The pad preferably includes a wear resistant layer on its inner diameter (ID) which prevents excessive wear of the pad. In one embodiment, the hydrodynamic/hydrostatic lift-off geometry is in the form of a groove formed on the inner pad. A cover may also be provided between inner pads at the ID and the support ring at the outer diameter OD in order to prevent leakage through the gap.

16 Claims, 11 Drawing Sheets

U.S. PATENT DOCUMENTS

| | | | |
|---|---|---|---|
| 5,755,445 A | 5/1998 | Arora | |
| 5,799,953 A | 9/1998 | Henderson | |
| 6,145,843 A | 11/2000 | Hwang | |
| 6,343,792 B1 | 2/2002 | Sinohara et al. | |
| 6,918,595 B2 | 7/2005 | Proper | |
| 2001/0006278 A1* | 7/2001 | Haje | 277/412 |
| 2002/0000694 A1 | 1/2002 | Justak | |
| 2004/0155410 A1 | 8/2004 | Proctor et al. | |
| 2004/0207158 A1* | 10/2004 | Agrawal et al. | 277/364 |
| 2007/0096397 A1 | 5/2007 | Justak | |

FOREIGN PATENT DOCUMENTS

| | | |
|---|---|---|
| GB | 2063385 A | 6/1981 |
| GB | 2076474 A | 12/1981 |

OTHER PUBLICATIONS

International Search Report for PCT Application No. PCT/US2007/011508, issued Mar. 5, 2008 (5 pages).

Nakane, H., et al., "The Development of High Performance Leaf Seals," Proceedings of ASME Turbo Expo 2002, Amsterdam, Netherlands, p. 19, (Jun. 3-6, 2002).

* cited by examiner

NON-CONTACTING SEAL FOR ROTATING SURFACES

CROSS REFERENCES TO RELATED APPLICATIONS

The present application is a continuation of U.S. application Ser. No. 11/121,374 filed May 4, 2005 which claims the benefit of U.S. Provisional Application No. 60/567,868, filed May 4, 2004. The entire contents of the above applications are incorporated herein by reference in their entirety.

TECHNICAL FIELD

This invention relates generally to seals used for rotating equipment, and more particularly, to a non-contacting seal used with gas or steam turbine engines, compressors and the like.

BACKGROUND

The use of seals for sealing gaps between a rotating and a non-rotating element, such as those found in gas turbine engines, in order to prevent fluids from leaking around rotating equipment is well known in the art. Conventional dynamic seals used for rotating equipment such as gas or steam turbine engines, compressors and the like, are traditionally designed as either non-contacting seals having a gap between the seal and the rotating surface, for example a labyrinth seal, or as contacting seals without a gap for example, brush seals, segmented carbon seals, and the like. Contacting seals are designed to minimize leakage at the cost of friction and wear of seal faces. On the other hand, non-contacting seals are designed to operate with some face separation to reduce frictional heat generation and wear at the cost of some leakage. Because of the size of the gaps typically created, non-contacting labyrinth seals have been found to have high levels of leakage during use. However, an advantage of such labyrinth seals is that they are traditionally made from metallic structures and, hence, can be used at high temperatures and for high surface speed applications. Generally, such seals are designed with a gap greater than the normal rotor growth and excursions to avoid rotor contact. In unusual cases when the rotor does contact the seal, the seal gap further enlarges, thereby, degrading seal performance and equipment efficiency.

Other types of non-contacting seals, such as non-contacting hydrodynamic and hydrostatic seals used in turbomachinery, particularly in gas compressors, are also known in the art. Unlike labyrinth seals, non-contacting hydrodynamic seals run on very thin fluid or gas films, typically in the range of about 50-300 µinch, as compared to labyrinth radial clearances which are typically in the range of 0.02-0.1 inch. Non-contacting circumferential seals have also posed design challenges. Some of the design requirements of non-contacting, particularly circumferential seals include: 1.) the ability of the seal inner diameter (ID) to conform to the variation of the rotor outer diameter (OD); 2.) the provision of hydrodynamic and/or hydrostatic grooves at the seal ID to provide seal lift-off at relatively low r.p.m to minimize groove wear; 3.) the balancing of seal radial compliance to conform to the rotor OD and sufficient axial stiffness to withstand the differential pressure between the high and low pressure sides; 4.) the provision of fluid or gas film stiffness sufficiently higher than the radial structural stiffness of the seal so as to provide non-contact operation at high speeds even during transient rotor excursions; and 5.) the use of high temperature/high strength superalloy materials for high temperature operation while also providing for shallow hydrodynamic/hydrostatic grooves.

The face seals of non-contacting seals can be polished extremely flat so that mating surfaces are parallel and can operate with very small gap clearance in the range of about 50-300 µinch, to provide stable non-contacting film riding conditions, as known in the art. In such seals, the dimensions required have been found to be critical and the seal face materials should not distort over a wide range of temperature and pressure. Conventional non-contacting seals may include very shallow (100-300 µinch) hydrodynamic and/or hydrostatic grooves such as spiral grooves, Raleigh pads or radial grooves, as is also known in the art. As the rotor speed and system pressure increase, fluid or gas pressure within these shallow grooves build up which can cause the rotor to unacceptably separate from the seal interface. The seal opening force generated by these shallow grooves drops off rapidly as the gap between the sealing surfaces increases. For circumferential seals, the sealing interface is circular around the circumference of the rotor. Lastly, the clearance of the sealing interface cannot be controlled as precisely as the face seals because of a number of factors, including rotor non-circularity, run-out, radial excursion, centrifugal growth and the like.

Segmented carbon seals are contacting seals that typically have a much lower leakage than labyrinth seals, as they tend only to make light contact with the rotating surface. However, the application temperature and surface speed of segmented carbon seals are both limited. For example, at temperatures above about 1000° F. and surface speeds above about 300 ft/sec., segmented carbon seals are generally not used due to performance limitations. Brush seals are traditionally made of high temperature superalloy bristles and, hence, their application temperatures and surface speeds are greater than those of segmented carbon seals. Typically, brush seals are used in applications up to about 1200° to 1400° F. and speeds up to about 1000-1200 ft/sec. For example, in gas turbine engines brush seals are often utilized to minimize leakage of fluids at circumferential gaps, such as between a machine housing and a rotor, around a rotary shaft of the engine, and between two spaces having different fluid pressure within the engine. In turbine engines, the fluid pressure within the system, (which may be either liquid or gas) is greater than the discharge pressure (the pressure outside the area of the engine housing, toward which the fluid will tend to leak), thus creating a pressure differential in the system. As used herein, the system pressure side of is referred to as the high pressure side, while the discharge pressure side is referred to as the low pressure side.

Both carbon segmented seals and brush seals wear with time, and as they wear their performance degrades, as known to those of skill in the art. In addition, metallic brush seals are not generally used at surface speeds greater than about 1200 ft/sec. because of the potential for bristle tip melting. Surface speeds in the vicinity of a gas-path can generally be greater than about 1200 ft/sec and, thus, brush seals are typically not suitable for such applications.

In order to enhance efficiency of rotating equipment, both the application temperature and surface speed are constantly being increased. Currently, the only known sealing system available for these extremely high temperature/high surface speed applications is the larger-gap labyrinth seal.

Therefore, there is a need for advanced high temperature seals which are capable of running with a smaller gap or clearance compared to labyrinth seals for high temperature and speed applications in order to enhance equipment efficiency.

SUMMARY

In accordance with the present invention, there is provided a non-contacting seal for use in high temperature applications higher than about 1200° F. The seal includes at least one segment having an inner pad with a hydrodynamic/hydrostatic lift-off geometry that generates a seal opening force which enables the seal to run in a non-contact mode, and at least one finger spring supported on the pad that aids in making the seal radially compliant while also being axially stiff, compared to the radial direction. In one embodiment, multiple segments are supported on a support member spaced from the pad to form a gap (g) therebetween. The pad preferably includes a wear resistant layer on its inner diameter (ID) which prevents excessive wear of the pad. In one embodiment, the hydrodynamic/hydrostatic lift-off geometry is in the form of a groove formed on the inner pad and the support member is a circumferential ring. A cover may also be provided between inner pads at the ID and the support ring at the outer diameter OD in order to prevent leakage through the gap. In one embodiment, the seal gap may be about 100-200 µinch compared to about 0.02"-0.05" for labyrinth seals. The reduction of the gap between the seal and the rotating surface is expected to reduce the seal leakage as compared to a conventional labyrinth seals.

BRIEF DESCRIPTION OF THE DRAWINGS

It should be understood that the drawings are provided for the purpose of illustration only and are not intended to define the limits of the invention. The present invention is not limited to the precise arrangements and instrumentalities shown in the drawings, and the drawings are not necessarily to scale, emphasis instead being placed upon illustrating the principles disclosed herein, wherein.

DETAILED DESCRIPTION OF THE PREFERRED EMBODIMENT

Figure 1:
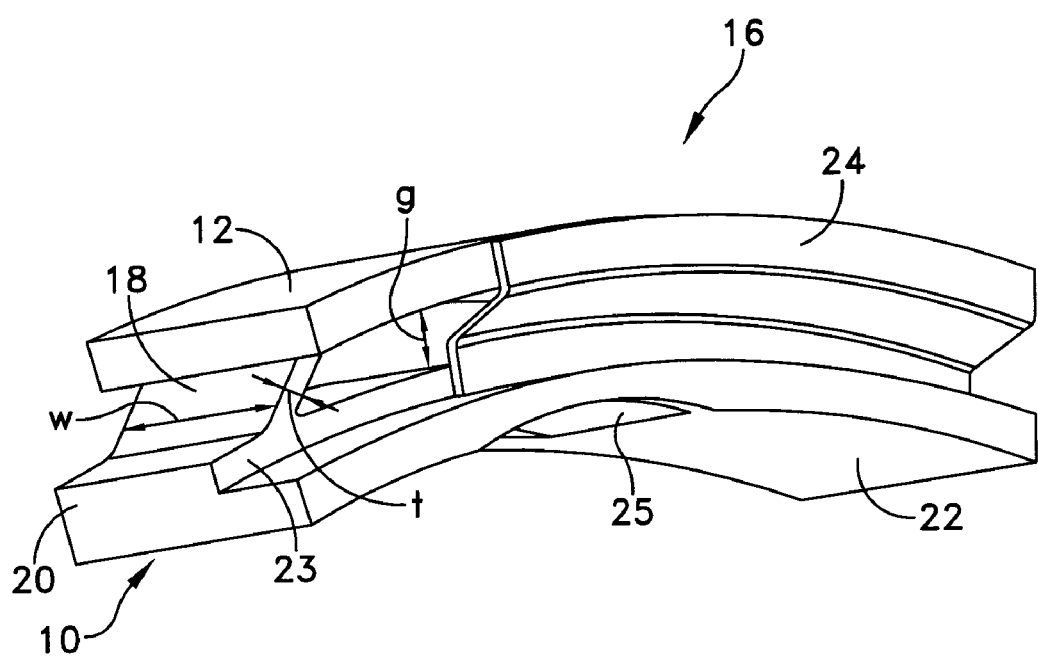
FIG. 1 is a perspective view of a non-contacting seal according to the present invention for sealing a gap between a stator casing and rotor.

Referring initially to FIG. 1, there is illustrated a perspective view of a segment 16 of a non-contacting seal 10 for sealing the gap between a non-rotating and a rotating surface, for example stator casing 14 and rotor 15 (FIG. 3), at application temperatures greater than about 1200° F. Each segment 16 preferably includes an inner pad 20 having a hydrodynamic/hydrostatic lift-off geometry which enables the seal to run in a non-contact mode, the inner pad also supporting finger spring 18 that aids in making the seal radially compliant while also being axially stiff (as compared to the radial direction). To form a complete non-contacting seal 10, multiple segments 16 may be secured to an outer support member or ring 12 along a circumference thereof such that the inner pad is spaced from the support member and forms a gap (g) therebetween. The outer support ring 12 may preferably be formed as a single, unitary ring supported in a seal cavity of a stator casing 14, or alternatively may be formed as multiple sections connected together to form the ring. For high temperature applications the support ring, inner pads and spring fingers may all be preferably formed of a superalloy material, for example, alloy 718, Waspaloy or MARM 247 and the like, as would be known to those of skill in the art.

The inner pad 20 preferably includes a suitable wear resistant layer 22 on its inner diameter (ID) which prevents excessive wear of the pad during moments when the seal contacts the rotating member. The wear resistant layer 22 may be a thermal sprayed coating selected from a group of tribological coatings including, but not limited to, chromium carbide, aluminum oxide, aluminum/titanium oxides and the like, or a monolithic ceramic layer brazed or otherwise joined to the superalloy inner pad, and which may be selected from the group consisting of transformation toughened zirconia, $Si_3N_4$ and other advanced ceramics or CMCs exhibiting both toughness and wear resistance. Alternately, other materials may be utilized for the wear resistant layer, provided that they provide sufficient wear resistance for the particular application last known to those of skill in the art. In any instance, the inner pad should be capable of operation at high temperatures. The ID of the wear resistant layer may be precision ground to a desired diameter corresponding to the rotor diameter. The ID of the inner pad can be somewhat greater, for example, about 0-0.005" radially, in the as-installed cold stationary condition. The lift-off geometries may be formed on the wear-resistant layer as grooves 25 to preserve their design features during occasional rotor contacts with the seal ID, as described in greater detail below.

Figure 3:
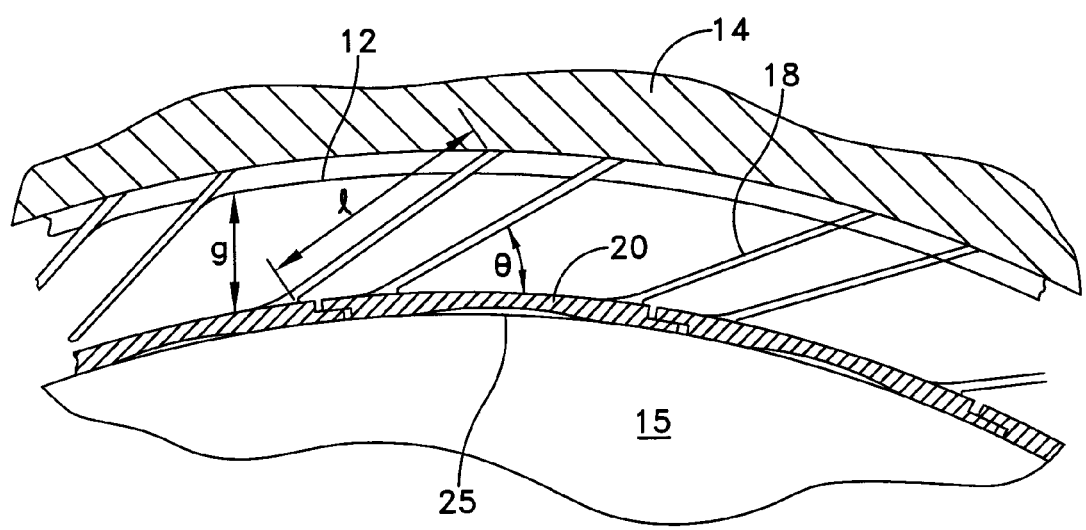
FIG. 3 is a front view of the non-contacting seal of FIG. 1.

Referring now to FIG. 3 in conjunction with FIG. 1, each segment 16 may include at least one finger spring 18 supported by inner pad 20. Each finger spring includes a width (w), thickness (t), length (l) and is disposed at an angle (θ) with respect to the inner pad 20. The finger springs 18 may preferably be designed so that segments are radially compliant and can be displaced radially by the opening force generated by the hydrodynamic/hydrostatic geometry on the inner pad 20. However, the finger springs should also preferably have a sufficient axially stiffness to withstand the pressure differential between the upstream and downstream sides. Thus, the segments 16 are preferably radially compliant but axially stiff. The radial spring rate of the segment or the force necessary to move the inner pad radially per unit length (lb/inch) can be controlled by selecting appropriate values of the angle (θ) of the inclined finger springs, width (w), thickness (t) and length (l) of the finger springs. The inner pad 20 may be formed as a single, unitary member with the finger springs 18 as shown in FIG. 1. Alternatively, individual finger springs can be separately formed from the outer ring and inner pad and thereafter attached to the outer ring and inner pads.

Figure 2:
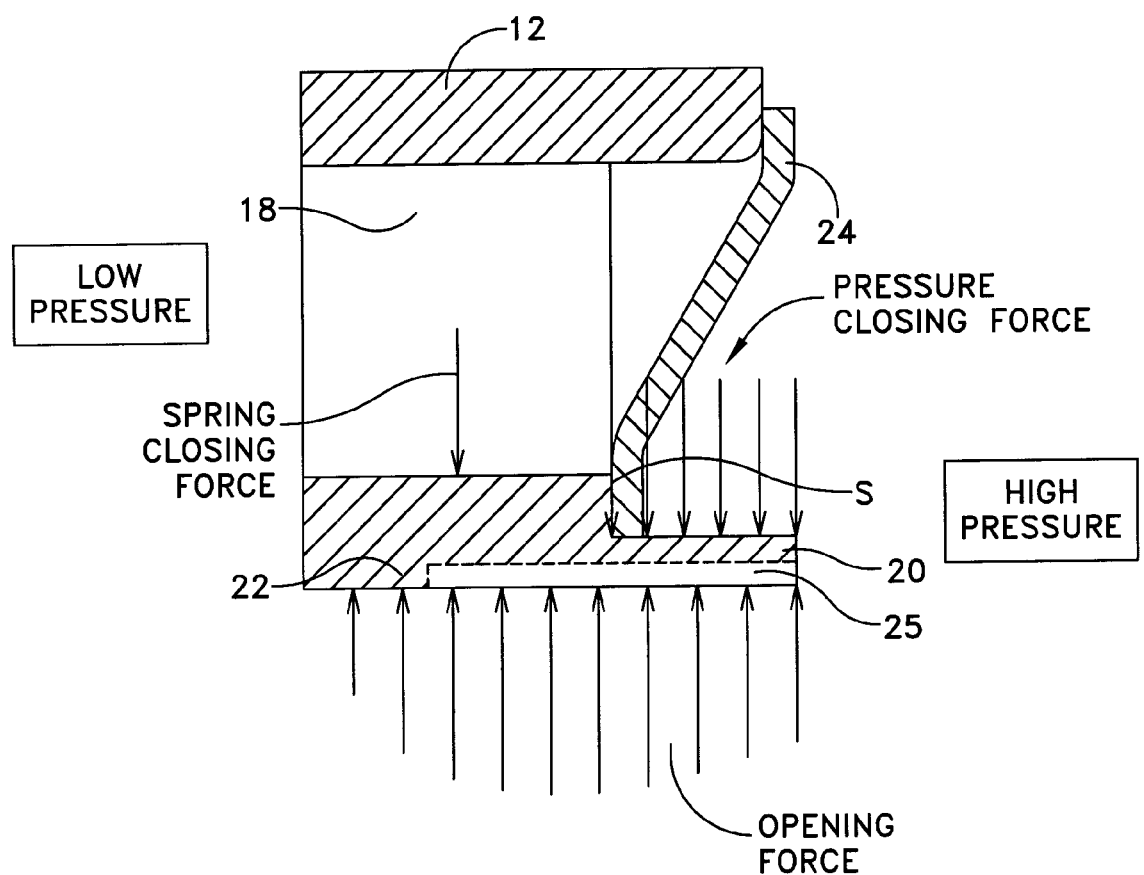
FIG. 2 is a cross-sectional schematic view in of FIG. 1 illustrating seal opening and closing forces.

To provide secondary sealing and prevent leakage through the gap (g) disposed between inner pads at the ID and the support ring at the outer diameter (OD), a front cover 24 may be provided. The front cover 24 may be formed from a stamped superalloy sheet stock and may be welded or brazed at the OD of the outer support ring 12. A single cover or overlapping layers, top and bottom, of front covers 24 may be used to provide effective secondary sealing. In the present embodiment, an inner pad step 23 may be provided which extends from the inner pad for attachment of the cover 24. The axial position of the step on the inner pad segments to which the front covers are attached provides seal balance as illustrated in FIG. 2. The total closing force is the sum of the pressure force acting on the pad segments ahead of the front cover and the spring force provided by the finger springs. The corresponding opening force consists of the combined hydrostatic and hydrodynamic force generated by radial grooves which may be provided at the ID of each segment, as described in greater detail below.

The cross section of the covers 24 may be biased so that the covers will remain closed (i.e. continue to prevent leakage) even without upstream pressure Pu i.e. under the condition of Pu−Pd=0 or Δp=0 (where Pu=upstream pressure, Pd=downstream pressure). As the system pressure builds up, the front covers 24 will be further pushed against the outer ring 12, thus providing static sealing for the annular space between the rotor and the stator housing.

Figure 4:
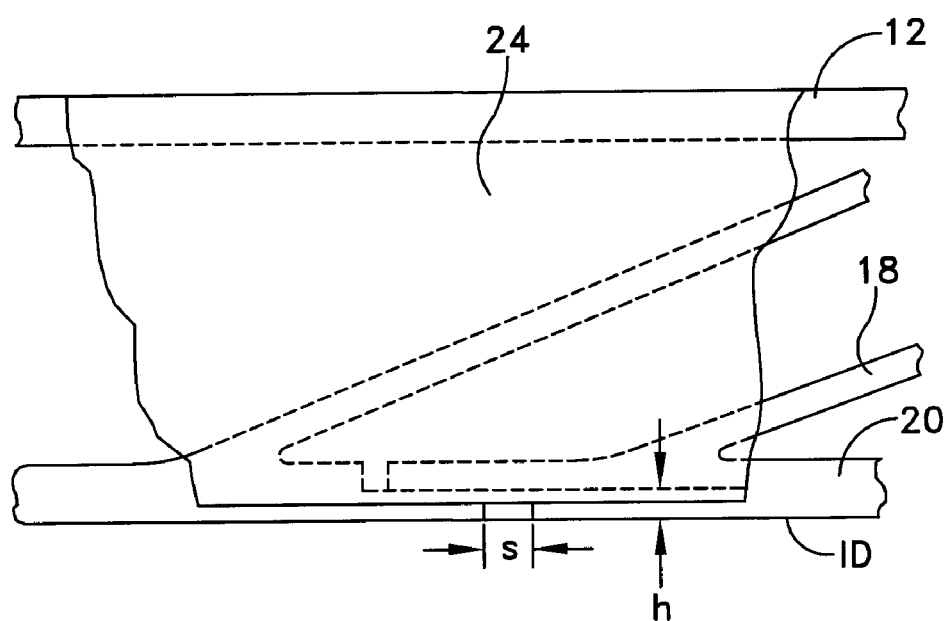
FIG. 4 is an enlarged top view illustrating the front cover of FIG. 1.
Figure 5:
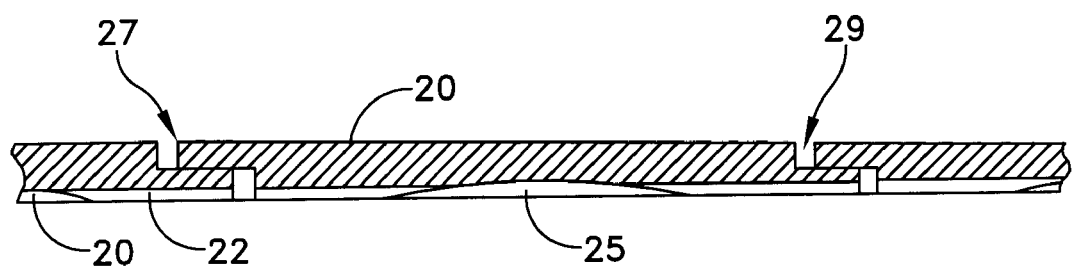
FIG. 5 is front, cross-sectional view of the wear resistant layer including a radial groove of FIG. 1.

FIG. 4 illustrates the front cover 24 at the joint between the individual segments 16. In the present embodiment, the inner pads 20 may be stepped, "s," at both a first 27 and a second end 29 so that adjacent pads mate in a tongue and groove fashion (FIG. 5). In this manner, small leakage channels connecting the upstream and downstream sides whose height is equal to the step height (h) and inter segment gap (s) are formed. This interlocking tongue and groove arrangement also allows the seal ID to enlarge and adapt to rotor growth while maintaining a sealing cover over the inter segment leakage channels. The ID of the front covers may partially cover the step height to reduce the channel leakage but maintain a gap (Δr), which is greater than the total rotor closure including thermal and centrifugal growth, rotor excursions through critical speeds, manufacturing and installation, tolerances and the like. Typically, this value of Δr may be in the range of about 0.030"-0.1", depending on the size and design of the rotating equipment. Due to the clearance, the rotor is not expected to contact the ID of the front covers 24.

Figure 6:
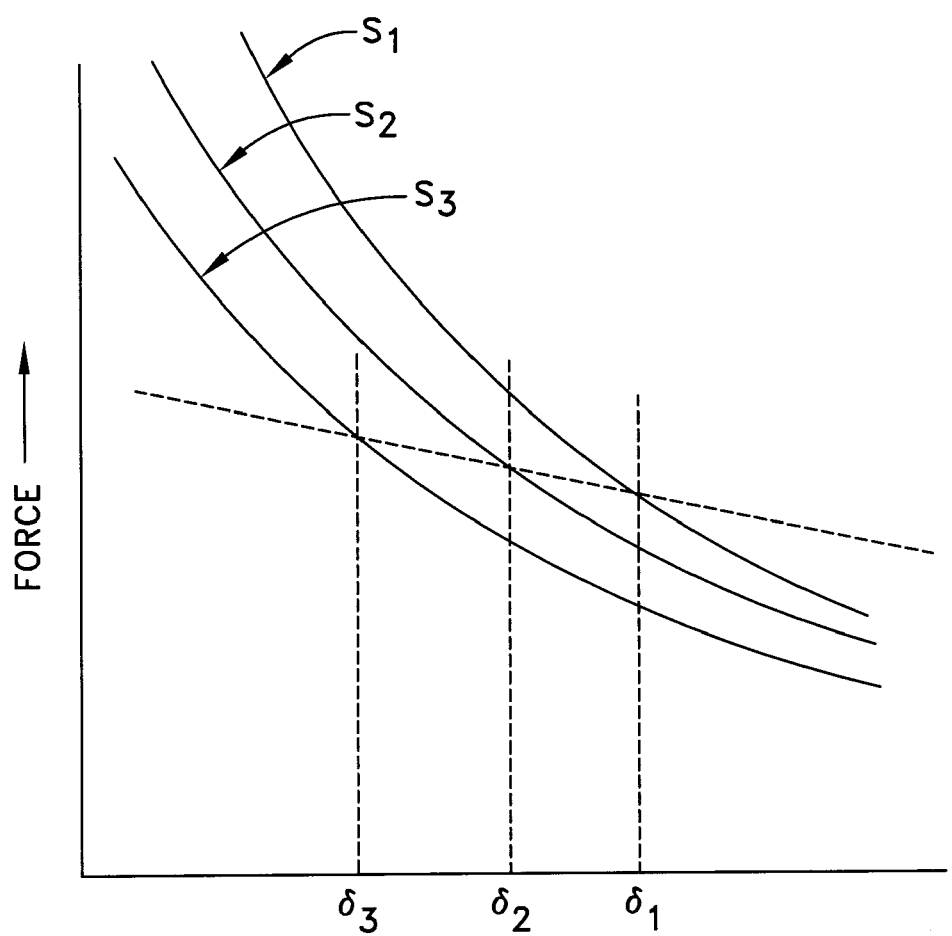
FIG. 6 is a schematic illustration of opening and closing forces of the non-contacting seal of FIG. 1.

Appropriate hydrodynamic/hydrostatic geometries, such as grooves 25, in particular radial grooves, Raleigh pads, and/or spiral grooves may preferably be formed on the ID of the wear resistant layer 22 of the inner pads 20 as described herein above and shown in FIG. 5. In use, as the rotor picks up speed, fluid pressure builds up underneath the hydrodynamic/hydrostatic lift-off geometry of the individual segments 16. This results in an opening force pushing the segments 16 away from the moving rotor 15. However, the equilibrium running clearance is reached corresponding to each running speed. FIG. 6 schematically illustrates equilibrium seal clearance values ($\delta_1$ $\delta_2$ and $\delta_3$) corresponding to various rotor speeds ($S_1$, $S_2$ and $S_3$). As the seal leakage is controlled by the annular gap clearance between the rotor and the inner pads of the segments, the radial spring rate of the segments and liftoff geometry of the inner pad are adjusted to minimize the equilibrium running clearance. A lower equilibrium clearance also increases the fluid film stiffness which is given by the slope of the opening force curve at the equilibrium clearance.

The outer ring, finger springs, inner pads and front covers, are all preferably made from high temperature high strength superalloys such as Waspaloy, alloy 718, Rene 41, Rene 80, MARM 247 or similar alloys that are capable of operation in the temperature range of about 1200° to about 1800° F., as would be known in the art. Short arc lengths and low radial stiffness of the segments allow the seal ID to conform to the variation of rotor OD, for example non-circularity, run-out, excursion, etc., such rotor variations being known to those of skill in the art. The axial stiffness provides support to the front covers against the upstream system pressure. The design of seal 10 is balanced such that the system pressure acts partially as both closing and opening forces which cancel each other. Therefore, a low spring force can be used even at high pressures for easy "lift-off" or non-contact operation. For unbalanced designs, the closing force is provided solely by the spring force. A stiffer spring for high system pressures retards seal "lift-off". With a more compliant spring, the seal clearance will open wide under high pressures. Thus, a balanced seal design helps to optimize the operation of the present seal.

Figure 7:
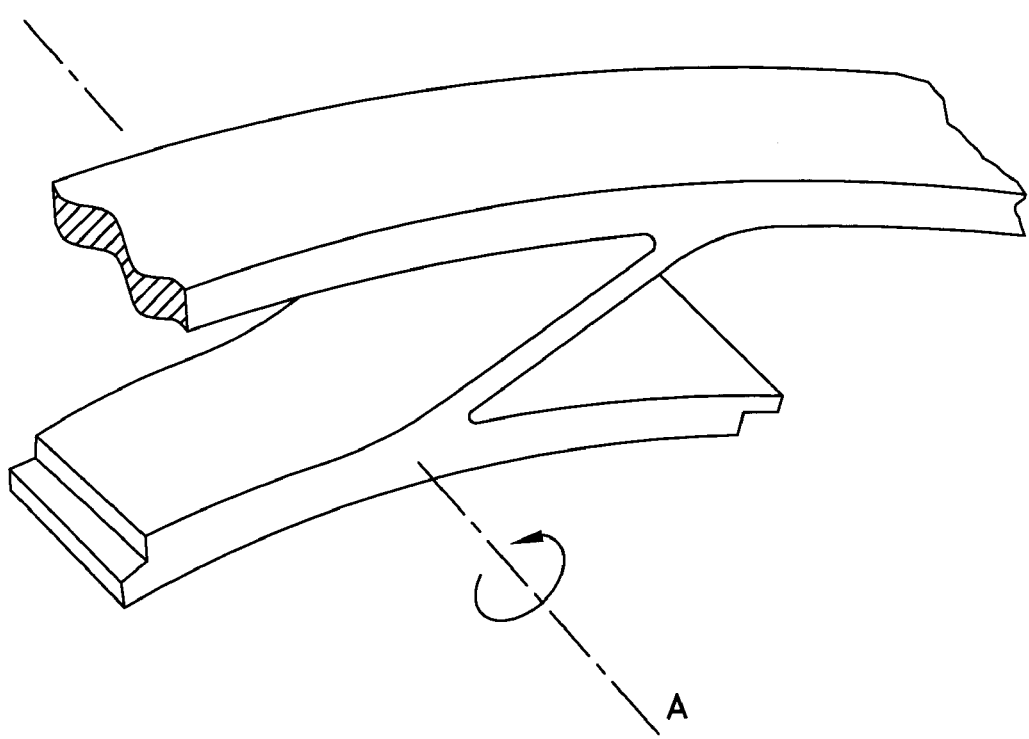
FIG. 7 is a first alternate embodiment of the non-contacting seal of FIG. 1.
Figure 8:
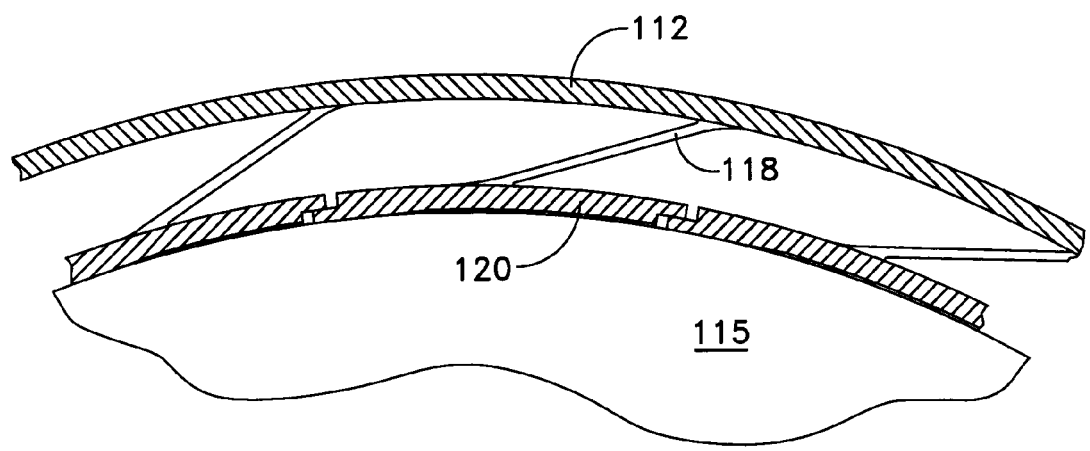
FIG. 8 is a cross sectional view of the embodiment of FIG. 8.

An alternate embodiment for the finger spring and inner pad is illustrated in FIGS. 7 and 8. In this embodiment all elements that are substantially the same as the elements in the previous embodiment have the same reference numeral with a leading "1". The seal 110 of FIG. 8 includes a single finger spring 118 supported on the inner pad 120 so that the inner pad is able to tilt about the axis "A" at the intersection of the finger spring and the inner pad as schematically shown in FIG. 8. This tilting action of the inner pad allows for a converging fluid film to form in the direction of rotation, thereby developing an opening force without the need for hydrodynamic and/or hydrostatic geometry such as radial grooves. Alternatively, various hydrodynamic geometry can also be machined on the ID of the inner pad as discussed in the first embodiment.

Figure 9:
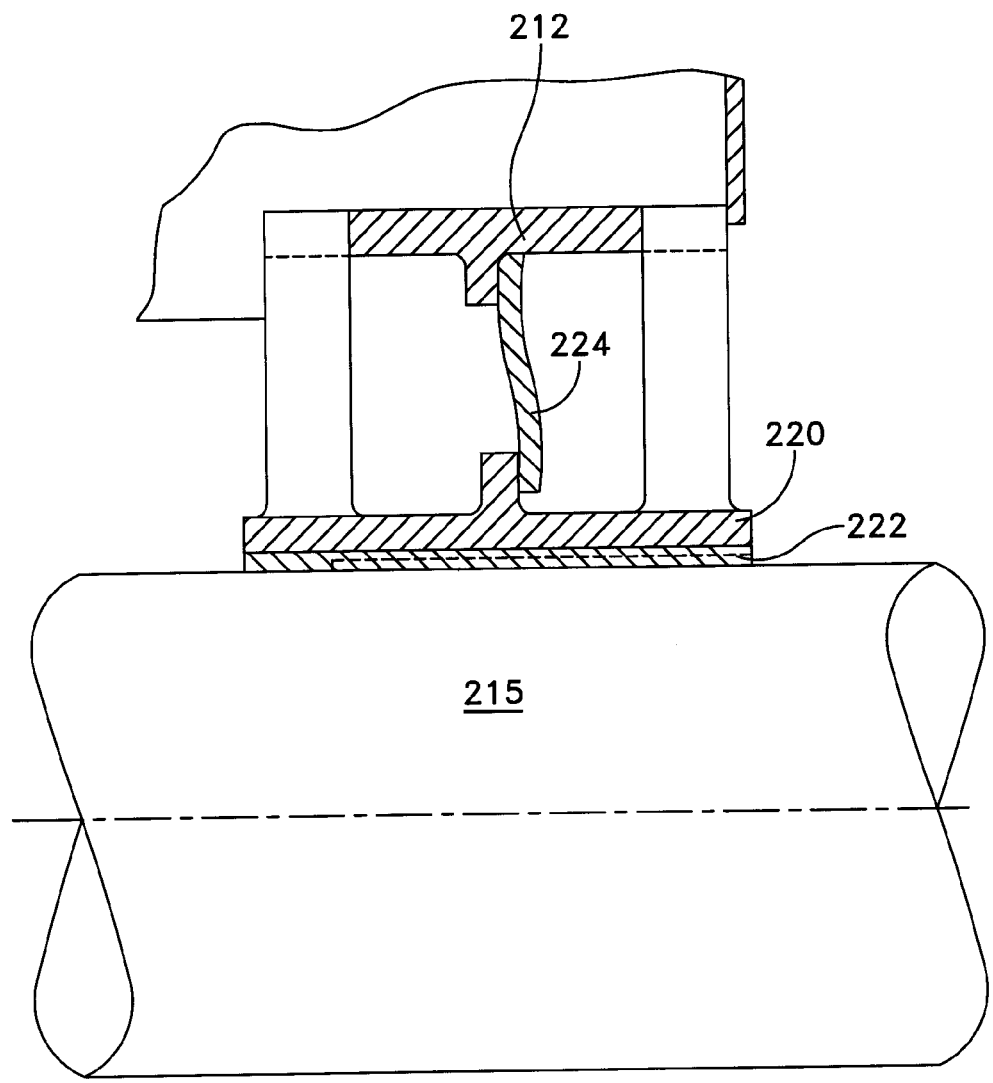
FIG. 9 is another alternate embodiment of the non-contacting seal of FIG. 1

Referring now to FIG. 9, there is illustrated another embodiment of the invention showing a balanced seal design for higher Δp applications. In this embodiment all elements that are substantially the same as the elements in the previous embodiment have the same reference numeral with a leading "2". The front covers 224 are preferably positioned at approximately the mid-section of the axial width of the seal 210 so that the upstream system pressure is also acting on a portion of the top surface of the inner pad 220 partially balancing the opening force acting underneath the inner pad. By selecting the location of ridge on the inner pad, the seal balance will be adjusted.

Figure 10:
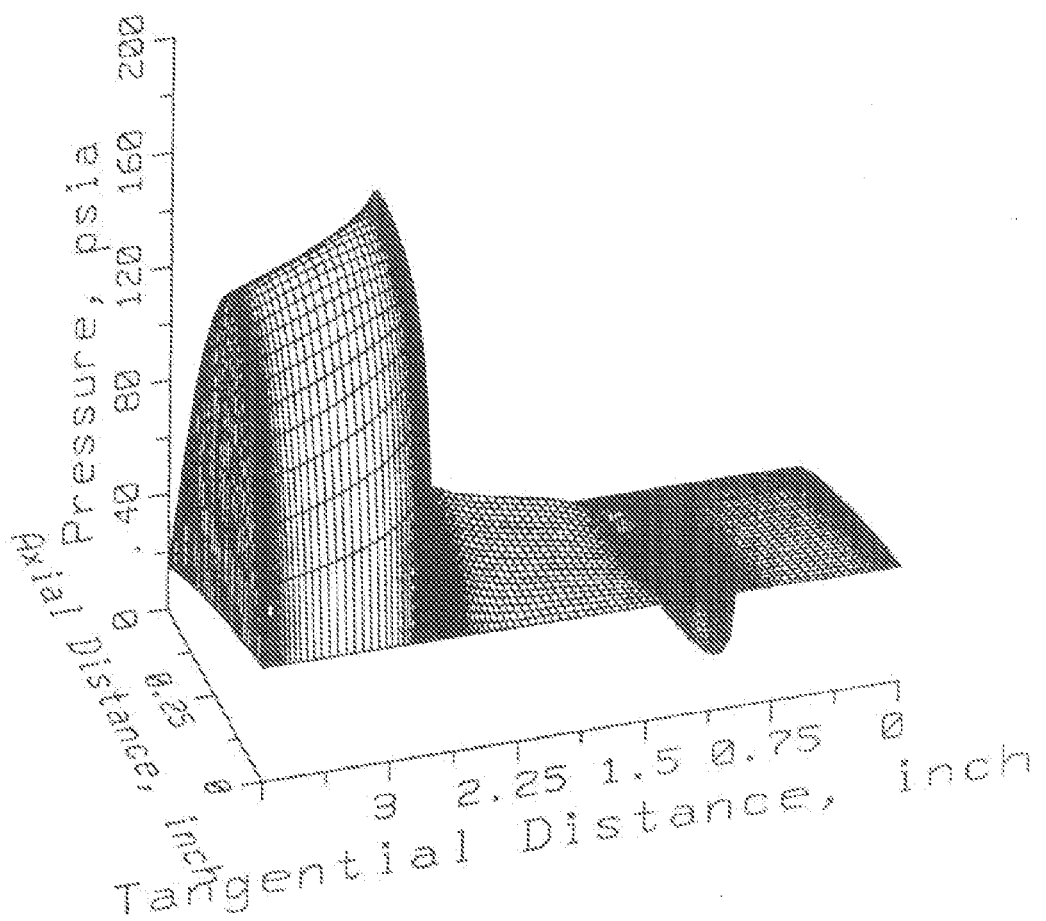
FIG. 10 illustrates an exemplary pressure distribution plot at the ID of an individual inner pad segment of a seal of FIG. 1.

Referring now to FIG. 10, an exemplary pressure distribution plot at the ID of an individual inner pad segment according to the embodiment of FIG. 1 is shown. This plot is illustrated for purposes of example only and does not limit the scope of the invention. As shown in FIG. 10, the distance on the x-axis represents the arc length of a single inner pad (3.14 inch) of a six segment seal with a six inch ID. The y-axis represents the pressure generated between the pad ID and rotor OD by the hydrodynamic/hydrostatic groove. In this embodiment the ID clearance=50 μinch, the radial groove width=1.5 inch and the radial groove length=0.5 inch. FIG. 10 illustrates the pressure distribution generated under the pad by the hydrostatic/hydrodynamic groove along the circumference in the direction of rotation. An axial pressure profile is schematically shown in FIG. 2 as an opening force. The total opening force is estimated by the volume integral under the pressure profile surface in FIG. 10. The above pressure profile is generated by proprietary fluid mechanical software, "CircumSeal", developed by Advanced Components & Materials, Inc.

Figure 11:
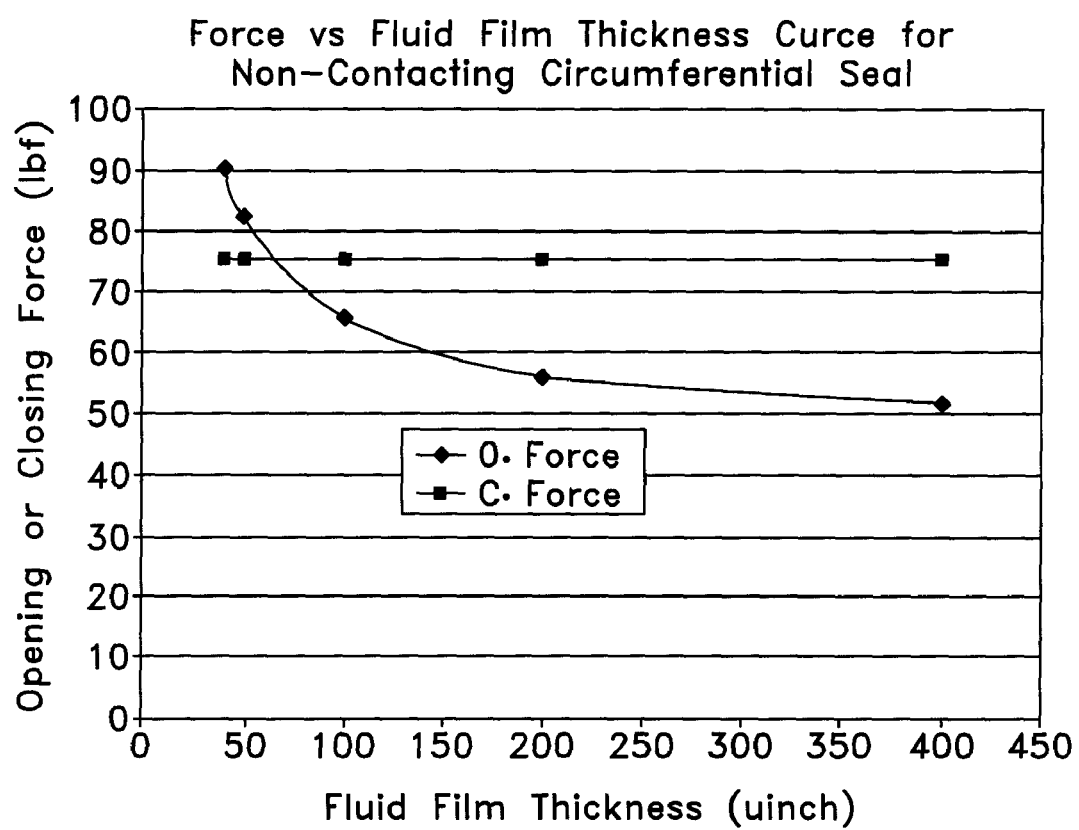
FIG. 11 illustrates an exemplary Force vs. Film thickness curve at a set rotor speed.

FIG. 11 illustrates an exemplary Force vs. Film Thickness or F-h curve for a particular rotor speed, in this case 8000 rpm, for a seal according to FIG. 1. This plot is illustrated for purposes of example only and does not limit the scope of the invention. The point of intersection between the opening force (O-Force) and the closing force (C-Force) defines the operating clearance between the rotor OD and seal ID. In this case the clearance at 8000 rpm is about 75 μinch which is significantly smaller than labyrinth seal clearance values (typically 0.02"-0.1"). The tangent to the opening force curve at the intersection defines the fluid film stiffness. In this case, it is about 400,000 lbs/inch. The fluid film stiffness should be greater than the radial stiffness of the seal structure, i.e., the total stiffness of the inclined finger springs supporting each inner pad containing the radial groove. In the case of a rotor excursion, the fluid film will push the seal away and prevent high speed seal/rotor contacts, thereby maintaining non-contact operation even at transient conditions.

In the static condition, the seal ID contacts the rotor OD as designed by the seal balance and the spring force (as-installed interference×seal radial stiffness). As the rotor picks up speed, the hydrodynamic force builds up by the radial groove and at a certain threshold speed, the total opening force (hydrodynamic and hydrostatic) will overcome the total closing force and the seal segments will "lift-off" and run in a non-contact mode. Likewise, the seal will "touch-down" below the threshold rotor speed.

The seal design parameters including inner pad dimensions, radial groove geometry, seal balance, finger spring stiffness, etc. should be optimized to minimize the threshold speed and maximize the film stiffness at various operating conditions. This will insure non-contact operation at all rotor speeds except at lower r.p.m. when the seal will run as a contacting seal. Hence, wear resistant coating on the seal ID is required to preserve the shallow groove geometry during seal/rotor contacts before "take-off" and after "touch-down".

It will be understood that various modifications may be made to the embodiments disclosed herein. For example, although the support ring is disclosed a being a single, unitary member, it may be formed as separate members which are joined. Also, the wear resistant layer of the inner pad may be a portion of the total pad or the entire pad may be formed of wear resistant material. Likewise, the examples provided are not to be construed as limiting, but as projected outcomes of exemplary embodiments. Therefore, the above description should not be construed as limiting, but merely as exemplifications of preferred embodiments. Those skilled in the art will envision other modifications within the scope, spirit and intent of the invention.

What is claimed is:

1. A non-contacting seal, comprising:
    an outer support member;
    at least one segment including:
    a.) an inner pad spaced from the outer support member, the inner pad having a wear resistant ceramic structure coupled to the inner pad at an inner diameter defined by the inner pad;
    b.) at least one lift-off geometry formed on an inner diameter of the wear resistant ceramic structure;
    c.) at least one finger spring supported at a first end by the inner pad and extending at an angle with respect to the inner pad and into contact with the outer support member; and
    a cover supported by the outer support member and the inner pad on an upstream, high pressure side of the seal, the cover being constructed and arranged to avert leakage through the space disposed between inner pad and the outer support member;
    wherein the at least one finger spring is constructed and arranged such the at least one finger spring is radially compliant to allow radial displacement of the at least one segment by an opening force generated by the lift-off geometry of the wear resistant ceramic structure; and
    wherein the cover is supported at approximately a midsection of the axial width of the seal so that upstream system pressure acts on both the cover and on a top surface of the inner pad so as to balance the opening force acting under the inner pad during use.

2. The non-contacting seal of claim 1, wherein the inner pad is a superalloy material and the wear resistant ceramic structure is a monolithic ceramic layer.

3. The non-contacting seal of claim 2, wherein the wear resistant ceramic structure is selected from the group consisting of transformation toughened zirconia and $Si_3N_4$.

4. The non-contacting seal of claim 1, wherein the at least one lift-off geometry is at least one groove selected from the group consisting of radial grooves, Raleigh grooves and spiral grooves.

5. The non-contacting seal of claim 1, wherein the finger spring and the inner pad are formed as a single, unitary structure.

6. The non-contacting seal of claim 1, further comprising an inner pad step extending from the inner pad, and wherein a cover is secured at a first end to the inner pad step and at a second end to the outer ring.

7. The non-contacting seal of claim 1, wherein the at least one segment includes a plurality of segments, the inner pad of each segment having a first end and a second end, the first and second ends each being stepped so that end of adjacent pads mate in a tongue and groove fashion such that leakage channels constructed and dimensioned for fluid flow from the upstream and downstream sides are formed.

8. A non-contacting seal for sealing a gap between a rotating and non-rotating surface, the seal comprising:
    an outer support member;
    at least one segment including:
    a.) an inner pad spaced from the outer support member, the inner pad having a wear resistant ceramic structure coupled to the inner pad at an inner diameter defined by the inner pad;
    b.) at least one lift-off geometry formed on an inner diameter of the wear resistant ceramic structure;
    c.) at least one finger spring supported at a first end by the inner pad and extending an angle with respect to the inner pad and into contact with the outer support member, the at least one finger having a width, thickness and a length;
    a cover supported by the outer support member and the inner pad on an upstream, high pressure side of the seal, the cover being constructed and arranged to avert leakage through the space disposed between inner pad and the outer support member; and
    wherein the length, width, thickness and angle of the at least one finger spring are selected so that the spring is compliant in a radial direction during operation such that the at least one segment can be displaced radially by an opening force generated by the lift-off geometry of the wear resistant ceramic structure, and wherein the spring remains sufficiently stiff so as to provide support to the cover against the upstream high pressure.

9. The non-contacting seal of claim 8, wherein the inner pad is a superalloy material and the wear resistant ceramic structure is a monolithic ceramic layer.

10. The non-contacting seal of claim 9, wherein the wear resistant ceramic structure is selected from the group consisting of transformation toughened zirconia and $Si_3N_4$.

11. The non-contacting seal of claim 8, wherein the at least one lift-off geometry is at least one groove selected from the group consisting of radial grooves, Raleigh grooves and spiral grooves.

12. The non-contacting seal of claim 8, wherein the finger spring and the inner pad are formed as a single, unitary structure.

13. The non-contacting seal of claim 8, further comprising an inner pad step extending from the inner pad, and wherein the cover is secured at a first end to the inner pad step and at a second end to the outer ring.

14. A non-contacting seal, comprising:
an outer support member;
at least one segment including:
- a.) an inner pad spaced from the outer support member, the inner pad having a wear resistant layer disposed at an inner diameter defined by the inner pad;
- b.) at least one lift-off geometry formed on an inner diameter of the wear resistant layer;
- c.) at least one finger spring supported at a first end by the inner pad and extending at an angle with respect to the inner pad and into contact with the outer support member; and a cover supported by the outer support member and the inner pad on an upstream, high pressure side of the seal, the cover being constructed and arranged to avert leakage through the space disposed between inner pad and the outer support member;

wherein the at least one finger spring is constructed and arranged such the at least one finger spring is radially compliant to allow radial displacement of the at least one segment by an opening force generated by the lift-off geometry of the wear resistant layer; and wherein the cover is supported at approximately a mid-section of the axial width of the seal so that upstream system pressure acts on both the cover and on a top surface of the inner pad so as to balance the opening force acting under the inner pad during use.

15. The non-contacting seal of claim 14, wherein the at least one finger is configured to be displaced radially by an opening force generated by the lift-off geometry of the wear resistant layer, and wherein the spring remains sufficiently stiff so as to provide support to the cover against the upstream high pressure.

16. The non-contacting seal of claim 1, wherein the at least one segment includes a plurality of segments, the inner pad of each segment having a first end and a second end, the first and second ends each being stepped so that end of adjacent pads mate in a tongue and groove fashion such that leakage channels constructed and dimensioned for fluid flow from the upstream and downstream sides are formed.

* * * * *